N. A. OLIVER.
HEADLIGHT DIMMER.
APPLICATION FILED OCT. 24, 1921.
1,429,762. Patented Sept. 19, 1922.
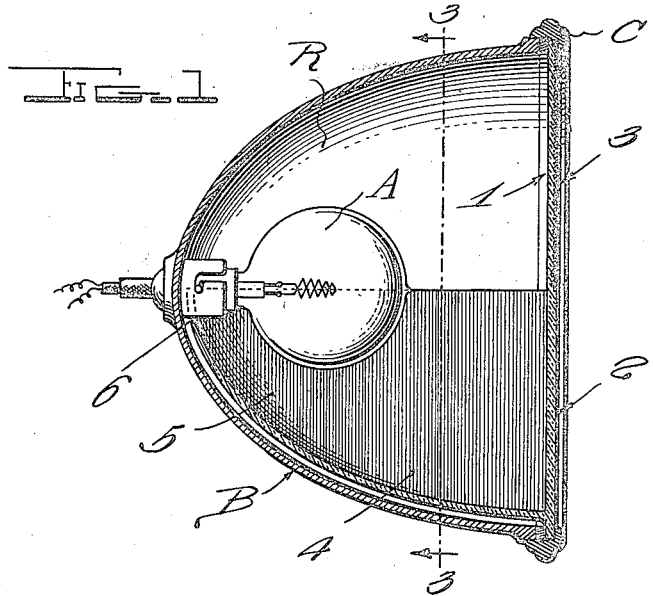
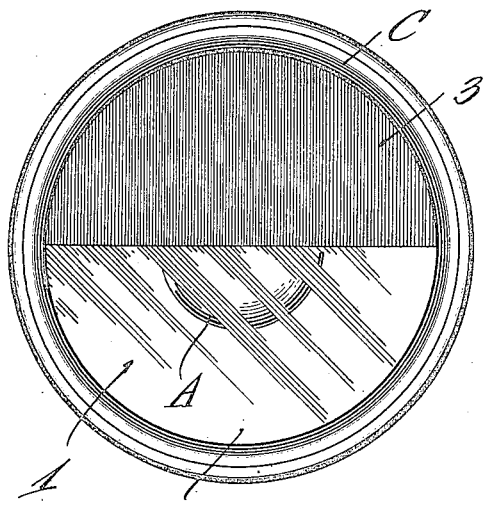
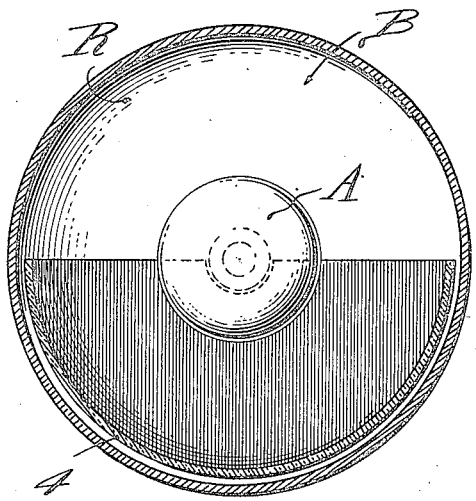
Inventor
Nathan A. Oliver
By
Attorneys Patented Sept. 19, 1922.

1,429,762

UNITED STATES PATENT OFFICE.

NATHAN A. OLIVER, OF MATTAPOISETT, MASSACHUSETTS.

HEADLIGHT DIMMER.

Application filed October 24, 1921. Serial No. 509,824.

*To all whom it may concern:*

Be it known that I, NATHAN A. OLIVER, a citizen of the United States, residing at Mattapoisett, in the county of Plymouth and State of Massachusetts, have invented certain new and useful Improvements in Headlight Dimmers; and I do declare the following to be a full, clear, and exact description of the invention, such as will enable others skilled in the art to which it appertains to make and use the same.

This invention relates to an improved attachment for automobile headlights which is designed to control the distribution of the light rays to permit the desired area to be illuminated, yet prevent the undesirable glare so as not to blind the drivers of approaching or passing machines.

The principal object of the invention is to generally improve upon headlight dimmers by providing one which is adapted to take the place of the usual lens, the improved attachment embodying a lens which permits free projection of the light rays through the lower-half of the lens but decidedly affects and dulls the light passing through the remaining portion of the lens, together with novel means cast integrally with the lens for extending into the body of the light and covering approximately the entire lower half of the reflector to render the latter ineffective and decidedly dull the rays of light projected through the lower-half of the aforesaid lens.

Other objects and advantages of the invention will be apparent during the course of the following description.

In the accompanying drawings forming a part of this specification and in which like numerals are employed to designate like parts throughout the same:

Figure 1 is a central vertical sectional view through a conventional type of automobile headlight equipped with a dimmer constructed in accordance with this invention.

Figure 2 is a front elevational view of Figure 1.

Figure 3 is a sectional view taken substantially on the plane of the line 3—3 of Fig. 1.

In the drawings, the letter B designates the body of a conventional type of automobile headlight, the inner side of which is covered by suitable reflecting surface R, against which the light rays from the illuminating device or bulb A are thrown to be intensified and projected forwardly through the usual lens. As before indicated, the existing type of lens is removed and my improved dimmer is substituted therefor, being held in place by the same clamping ring C.

The improved dimmer comprises a glass lens 1, the lower-half 2 of which is plain to permit the light rays from the illuminating device to be passed therethrough without being affected. The upper-half 3 of the lens is preferably ground to intercept and decidedly dim the light rays which are projected therethrough. It is not necessary that this glass be ground, but it may be covered with suitable light absorbing material or may be painted in the well known way. Integral with and extending laterally with respect to the lens is a substantially semi-parabolically shaped extension 4 which, when in use, extends inwardly into the body of the light and covers approximately one-half of the entire reflecting area in the manner shown so that that much of the reflecting surface is rendered practically ineffective. By carefully examining the portion of the reflecting surface rendered ineffective it will be seen that it is the lower half which is so affected and experience has taught that by controlling the light rays projected against this portion of the reflector, the undesired upward rays passing through the lens will be entirely eliminated. Hence, the light rays will be thrown downwardly against the road surface. To insure effective results, the entire inner surface of this extension 4 is covered with paint or is ground or otherwise constructed to render it "non-glaring." Hence, any light rays which are thrown outwardly through the lens by this "non-glaring" surface will be dimmed to such an extent as to render them harmless. The central and upper portion of the extension is notched as indicated at 6 to accommodate the bulb socket.

In use, the existing lens is removed and the improved lens is substituted therefor, being held in place, as is obvious by the existing clamping ring. In placing the dimmer in position, it is necessary to tilt the upper portion of the lens outwardly away from the body of the headlight and slide the light dulling extension beneath the bulb.

From the foregoing description it will be seen that I have devised a novel dimmer which is extremely simple in construction and is advantageous from the manufacturer's standpoint in view of the fact that it can be molded in one piece and conveniently sold in this way. By affecting the light rays both at points above and below the illuminating device and concentrating them and distributing them through the lower plain half of the lens, an extremely desirable light is provided. The rays are thrown downwardly onto the road and all upward undesirable rays are eliminated and it has been found that sufficient light is thrown out to enable safe driving, yet eliminating the undesirable feature of excessive blinding light which is not within the law of most States.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

An automobile headlight lens comprising a glass disk having smooth faces, the lower half of said disk being plain and the upper half thereof being ground for dimming the light rays projected therethrough above the horizontal axis of the illuminating element, and an integral substantially semi-parabolically shaped extension carried by the lower half of the disk and extending inwardly therefrom into the headlight to cover approximately the entire area of the lower half of the reflector, the inner surface of said extension being non-reflecting, whereby to decidedly effect and dull the light rays projected from the bulb toward the lower and central portion of the reflector.

In testimony whereof I have hereunto set my hand.

NATHAN A. OLIVER.